(12) United States Patent
Yu et al.

(10) Patent No.: US 6,560,238 B1
(45) Date of Patent: May 6, 2003

(54) CALENDAR QUEUE CACHE

(75) Inventors: JungJi John Yu, Saratoga, CA (US); Fu-Kang Frank Chao, Cupertino, CA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

(21) Appl. No.: 09/465,981

(22) Filed: Dec. 16, 1999

Related U.S. Application Data

(60) Provisional application No. 60/112,811, filed on Dec. 17, 1998, and provisional application No. 60/112,745, filed on Dec. 17, 1998.

(51) Int. Cl.$^7$ ............................................. H04L 12/56
(52) U.S. Cl. ........................................ 370/412; 370/229
(58) Field of Search ............................... 370/230, 230.1, 370/231, 395.1, 395.4, 395.41, 395.42, 465, 468, 229, 232, 233–235, 442, 347, 320, 328, 337, 338, 349, 350, 428, 411, 412, 389, 401, 351, 352

(56) References Cited

U.S. PATENT DOCUMENTS

| | | | |
|---|---|---|---|
| 5,371,852 A | | 12/1994 | Attanasio et al. |
| 5,473,599 A | | 12/1995 | Li et al. |
| 5,696,764 A | * | 12/1997 | Soumuiya et al. .......... 370/395 |
| 5,748,614 A | * | 5/1998 | Wallmeier ............. 370/395.41 |
| 5,850,398 A | * | 12/1998 | King, Jr. ..................... 370/230 |

OTHER PUBLICATIONS

U.S. patent application Ser. No. 09/465,123, Lin, filed Dec. 16, 1999.

Abadi, M., et al, "Secure Web Tunneling," http://pa.bell–labs.com/~abadi/Papers/tunnel/206.html, pp. 1–13 (Dec. 16, 2000).

"Intel ISP Program Case Studies: UUNET Canada Leads the Industry in Move to Virtual Private Networks," http://www.intel.com/isp/casestudies/uunet.htm, pp. 1–4 (2000).

"Tunnel Switching: 3Com Technology Boosts VPN Security and Flexibility," http://www.3com.com/technology/tech_net/white_papers/503049.html, pp. 10 (1999).

"Virtual Multi–megabit Access Path: Affordable and Available Internet and IP Access at Speeds Greater than T1," http://www.tiaranetworks.com/vmapwp.html, pp. 1–9 (1999).

"Web Workshop—Virtual Private Networking: An Overview," http://msdn.Microsoft.com/workshop/server/feature/vpnovw.asp, pp. 1–16 (May 29, 1998).

Ferguson, Paul and D. Senie, "Network Ingress Filtering: Defeating Denial of Service Attacks Which Employ IP Source Address Spoofing," http://andrew2.Andrew.cmu.edu/rfc/rfc2267.html, pp. 1–16 (Jan. 1998).

"The NetBoost Policy Engine: Comprehensive Platform Enables Today's Leading Policy Enforcement Applications to Operate at Full Wire Speed," NetBoost Corporation, pp. 1–9 (1998).

"The NetBoost Policy Appliance: Device Enables Concurrent Operation of Multiple Policy Enforcement Applications to Operate at Full Wire Speed," NetBoost Corporation (1998)..

(List continued on next page.)

Primary Examiner—Dang Ton
(74) Attorney, Agent, or Firm—Arnall Golden Gregory LLP

(57) ABSTRACT

A method of scheduling packet output according to a quality of service action specification, the method maintains a calendar queue of bandwidth timeslots, organizes the timeslots into groups, invokes a look-up logic circuitry to inspect a group of timeslots substantially simultaneously, determines a first unoccupied timeslot to schedule a current packet, and also determines a first occupied timeslot that contains a next packet to transmit.

15 Claims, 2 Drawing Sheets

OTHER PUBLICATIONS

"NetBoost PE—1000: Network Application Engine," Net-Boost Corporation (1998).

NetBoost SKD: Software Develoment Kit, Net Boost Corporation (1998).

"A New Breed: The Net Boost Platform for Policy Enforcement Applications," NetBoost Corporation, pp. 1–11 (1998).

Russell, Paul, "Keeping the TCP/IP Stream Flowing," Linux Magazine, http://www.linux–mag.com/1999–08/bestdefemse02.html, pp. 1–8 (Aug. 1999).

* cited by examiner

QoS Action Spec Table

| Action Spec # | Bandwidth (timeslots) |
|---|---|
| 20 | 2 |
| 21 | 5 |
| 25 | 4 |
| ⋮ | ⋮ |

Calendar Queue

Check valid bit before scheduling:

| | | |
|---|---|---|
| 1 | 20 | 0 |
| 1 | 21 | 1 |
| 1 | 25 | 2 |
| 0 | | 3 |
| 0 | | 4 |
| 0 | | 5 |
| 0 | | 6 |
| 0 | | 7 |
| 0 | | 8 |
| 0 | | 9 |
| ⋮ | ⋮ | 0 |

Set valid bit after scheduling:

| | |
|---|---|
| 0 | |
| 1 | 21 |
| 1 | 25 |
| 1 | 20 |
| 0 | |
| 0 | |
| 0 | |
| 0 | |
| 0 | |
| 0 | |
| ⋮ | ⋮ |

**Fig. 1
(PRIOR ART)**

CALENDAR QUEUE CACHE

RELATED APPLICATIONS

This application claims the benefit of priority to U.S. Provisional Patent Application No. 60/112,811, filed Dec. 17, 1998 and U.S. Provisional Patent Application No. 60/112,745, filed Dec. 17, 1998.

TECHNICAL FIELD

The present invention relates to a calendar queue for enforcing quality of service action specs and, in particular, to a calendar queue that utilizes a fast lookup logic to speed the process of filling and emptying the cache.

BACKGROUND

In one type of policy network, a Calendar Queue is used to schedule the output packets after policy enforcement according to the corresponding bandwidth (QoS Action Spec) which specifies when and how often the packets should depart. Conventionally, the mechanism is based on a queue that includes a plurality of equally spaced time slots. One timeslot represents one bandwidth unit. If the queue is implemented by hardware, then one time slot can be one external memory location, with these slots being contiguous external memory space. The operation is shown in FIG. 1.

When the packet for a given QoS Action Spec leaves the system, the conventional system first invalidates the current slot and advances to the new slot for next schedule after a bandwidth interval. If the new slot turns out to be valid (occupied by another QoS Action) then the system searches for the nearest invalid slot after the occupied one to schedule the next packet. In FIG. 1, the QoS Action Spec #20 that has a bandwidth equal to 2 represents this case.

The Action Spec #20, according its bandwidth, should be inserted to the time slot 2. But since the slot 2 has been occupied by the Action Spec #21 then the available slot 3 is selected. Checking the valid bit and searching the first available invalid bit involve a lot of memory access operations. Use of external memory creates a long latency for scheduling the packets. Even worse, if the memory is also shared by other processors, the arbitration time can make the latency even longer.

SUMMARY

The present invention is a method of scheduling packet output in accordance to a quality of service (QoS) action specification. A calendar queue of bandwidth timeslots is maintained, wherein the bandwidth timeslots are organized into groups. Look-up logic circuitry is invoked that inspects the bandwidth timeslots of a group in the queue substantially simultaneously. The look-up logic circuitry determines from the group a first unoccupied bandwidth timeslot in which a current packet can be scheduled and also determines from the group a first occupied bandwidth timeslot which contains a next packet to transmit.

BRIEF DESCRIPTION OF THE FIGURES

FIG. 1 illustrates a conventional calendar queue mechanism.

Figure 2:
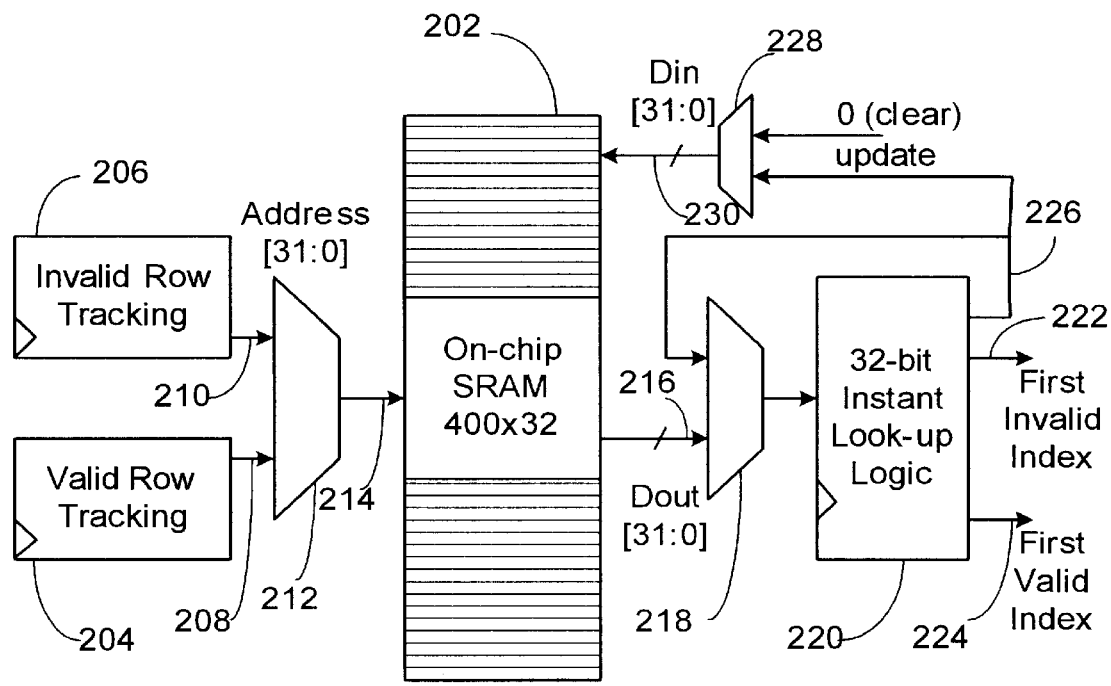
FIG. 2 illustrates an improved calendar queue implemented on an on-chip SRAM 202. The on-chip SRAM 202 provides fast access to the calendar queue without external memory access. The on-chip SRAM 202 has a 400 entries (or rows) and each entry (or row) has 32 bits according to the embodiment disclosed by FIG. 2. Each bit represents a timeslot. The selection of a single row is through a 32 bit address provided by either a valid row tracking logic 204 or an invalid row tracking logic 206. The valid row tracking logic 204 outputs a 32 bit address 208 and the invalid row tracking logic 206 also outputs a 32 bit address 210. An address multiplexer 212 outputs a 32 bit row index 214 selected the two 32 bit addresses provided by the valid row tracking logic 204 and the invalid row tracking logic 206. The 32 bit row index 214 from the address multiplexer address 212 is used for selecting a row of 32 timeslots 216 from the on-chip SRAM 202.

A row of 32 timeslots 216 passes through a data multiplexer 218 and is analyzed by a 32-bit instant look-up logic 220. The 32-bit instant look-up logic 220 analyzes 32 bits substantially simultaneously in a manner that is well known to people skilled in the art. The 32-bit instant look-up logic 220 also provides as part of its analysis a first invalid index 222 that indicates a first occupied timeslot and a first valid index 224 that indicates a first unoccupied timeslot.

After dispatching a packet, the particular timeslot in the on-chip SRAM 202 is updated. The 32-bit instant look-up logic 220 outputs the row with the selected timeslot 226, and this row of timeslots 226 is multiplexed at an update multiplexer 228, where the timeslot that has a packet dispatched is cleared. The updated row 230 is then stored in the on-chip SRAM 202.

DETAILED DESCRIPTION

In accordance with an embodiment of the present invention as shown in FIG. 2, an on-chip memory (e.g., SRAM) is employed to cache the valid bits of the calendar queue. In addition, an innovative fast look-up logic has been developed to speed up the search for the first available invalid bit.

The structure shown in FIG. 2 basically performs two operations. The first operation is to find the first valid bit (occupied time slot) so that the system can transmit the packets for the current Action Spec. The second operation is to find the first invalid bit (empty time slot) so that the current Action Spec can be scheduled for next departure.

In this structure, each 32-bit entry in SRAM represents 32 valid bits of 32 timeslots. (This embodiment employs 32-bit entry. However, other sized entries could be employed.) Therefore a small 400×32 SRAM can accommodate all valid bits of a calendar queue with 12K timeslots. As a result, 32 timeslots can be scanned in a single cycle and both the first empty slot and the first occupied slot in the current row (where one row represents 32 timeslots), if any, can be found in a single cycle.

If all slots in the current row are occupied, then the Invalid_Row_Tracking logic increments the row index and then the system advances to the next 32 timeslots to start the next scan for an available entry. On the other hand if all slots in the current row are empty, then the Valid_Row_Tracking logic increments the row index and then the system advances to next 32 timeslots to starts next scan for a valid entry.

What is claimed is:

1. A method of scheduling packet output in accordance to quality of service (QoS) action specification, comprising the steps of:

maintaining a calendar queue of bandwidth timeslots, wherein the bandwidth timeslots are organized into groups; and invoking look-up logic circuitry that inspects the bandwidth timeslots of a group in the queue in a single memory access cycle, wherein the look-up logic circuitry determines from the group a first unoccupied bandwidth timeslot in which a current packet can be scheduled and also determines from the group a firs occupied bandwidth timeslot which contains a next packet to transmit.

2. The method of claim 1 further comprising the step of incrementing a row index by an invalid_row_tracking logic if all bandwidth timeslots of the group are occupied.

3. The method of claim 1 further comprising the step of incrementing a row index by a valid_row_tracking logic if all bandwidth timeslots of the group are unoccupied.

4. The method of claim 1 further comprising the step of transmitting update information to the calendar queue using the look-up logic circuit.

5. The method of claim 1 further comprising the steps of
selecting an address between an invalid_row_tracking logic and a valid_row_tracking logic; and
retrieving an entry from the calendar queue based on the selected address.

6. An apparatus for implementing a calendar queue that schedules output packets, the calendar queue scheduling the output packets according to a quality of service action specification, the apparatus comprising:
a computer readable memory, the memory storing information on bandwidth timeslots of the calendar queue, wherein the bandwidth timeslots are organized in groups;
an instant look up logic receiving a group of bandwidth timeslots from the memory, wherein the instant look up logic inspects the group of bandwidth timeslots in a single memory access cycle; and
an update logic in communication with the instant look up logic, the update logic receiving update information from the instant look up logic and updating the calendar queue.

7. The apparatus of claim 6 further comprising:
a first valid bit output in communication with the instant look up logic, the first valid bit output providing information on a first occupied time slot; and
a first invalid bit output in communication with the instant look up logic, the first invalid bit output providing information on a first empty time slot.

8. The apparatus of claim 6, further comprising:
an invalid_row_tracking logic in communication with the memory; and
a valid_row_tracking logic in communication with the memory,
wherein the invalid_row_tracking logic increments a first row index if all the bandwidth timeslots in the group are occupied and the valid_row_tracking logic increments a second row index if all the bandwidth timeslots in the group are unoccupied.

9. The apparatus of claim 8, further comprising a selection logic in communication with the invalid_row_tracking logic and the valid_row_tracking logic, the selection logic selecting an address from either the invald_row_tracking logic or the valid_row_tracking logic and providing the address to the memory.

10. A method for determining a first occupied timeslot in a calendar queue, the method comprising the steps of:
storing timeslots of a calendar queue on a computer readable memory;
checking a plurality of timeslots using a look up logic;
retrieving the plurality of timeslots from the memory;
inspecting the plurality of timeslots in a single memory access cycle; and
determining an index for a first occupied timeslot.

11. The method of claim 10 further comprising the step of determining an index for a first unoccupied timeslot.

12. The method of claim 10 further comprising the steps of incrementing a first index using an invalid_row_tracking logic if all timeslots are occupied.

13. The method of claim 10 further comprising the steps of incrementing a second index using a valid_row_tracking logic if all timeslots are empty.

14. The method of claim 10 further comprising the steps of transmitting update information to the memory.

15. The method of claim 10 further comprising the steps of
selecting an address between an invalid_row_tracking logic and a valid_row_tracking logic; and
retrieving an entry from the memory based on the selected address.

* * * * *